(12) United States Patent
Wenzel et al.

(10) Patent No.: US 6,589,145 B1
(45) Date of Patent: Jul. 8, 2003

(54) ROLL AND CALENDER

(75) Inventors: Reinhard Wenzel, Krefeld (DE); Peter Dornfeld, Krefeld (DE)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 190 days.

(21) Appl. No.: 09/708,430

(22) Filed: Nov. 9, 2000

(30) Foreign Application Priority Data

Nov. 20, 1999 (DE) .......................................... 199 55 862

(51) Int. Cl.⁷ ........................... F16C 13/00; B21D 53/00
(52) U.S. Cl. ......................... 492/45; 226/191; 226/194; 226/90; 29/895.2
(58) Field of Search ................................. 492/45, 47, 7, 492/6; 29/895.21, 895.22; 100/162 B; 226/176, 177, 191, 194, 90

(56) References Cited

U.S. PATENT DOCUMENTS

| 3,672,018 | A | * | 6/1972 | Junk et al. .................... 492/7 |
| 3,885,283 | A | * | 5/1975 | Biondetti ....................... 492/7 |
| 4,069,569 | A | * | 1/1978 | Meckel et al. ................. 492/7 |
| 4,092,916 | A | * | 6/1978 | Link et al. .................. 100/174 |
| 4,213,232 | A | * | 7/1980 | Biondetti et al. .............. 492/7 |
| 4,319,389 | A | * | 3/1982 | Marchioro ..................... 492/7 |
| 4,399,747 | A | * | 8/1983 | Schiel et al. ................. 492/20 |
| 4,637,109 | A | * | 1/1987 | Bryer ........................... 492/10 |
| 4,709,571 | A | * | 12/1987 | Guttinger ....................... 492/2 |
| 4,779,320 | A | * | 10/1988 | Sonnen ......................... 492/45 |
| 4,848,119 | A | * | 7/1989 | Pav et al. ..................... 72/13.3 |
| 4,850,088 | A | * | 7/1989 | Speak ........................... 492/47 |
| 5,146,664 | A | * | 9/1992 | Biondetti ........................ 492/7 |
| 5,179,894 | A |   | 1/1993 | Hinz et al. |
| 5,785,636 | A |   | 7/1998 | Bonander et al. |

FOREIGN PATENT DOCUMENTS

| DE | 2919748 | 11/1980 |
| DE | 3604839 | 8/1987 |
| DE | 3611859 | 10/1987 |
| DE | 3936048 | 5/1991 |

* cited by examiner

*Primary Examiner*—Gregory Vidovich
*Assistant Examiner*—Marc Jimenez
(74) *Attorney, Agent, or Firm*—Greenblum & Bernstein, P.L.C.

(57) ABSTRACT

Roll that includes a roll axle, a roll jacket, and a bearing ring positioned to rotatably support the roll jacket, and calender that includes the roll. The bearing ring is non-rotatable but is radially movable relative to the roll axle. A locking device is positionably adjustable to selectively block and unblock a radial lift movement, and the locking device includes a rotatable part having a longitudinal opening. The rotatable part is rotatable into a first rotational position in which the longitudinal opening is oriented substantially parallel to a direction of the radial lift movement, and is rotatable into a second rotational position in which the radial lift movement is blocked. The calender further includes a neighboring roll arranged to form a nip with the roll, and at least one further roll. The neighboring roll and the further rolls are mounted for displacement in the pressing direction, and a device arranged to selectively block and unblock the displacement of the neighboring roll.

15 Claims, 4 Drawing Sheets

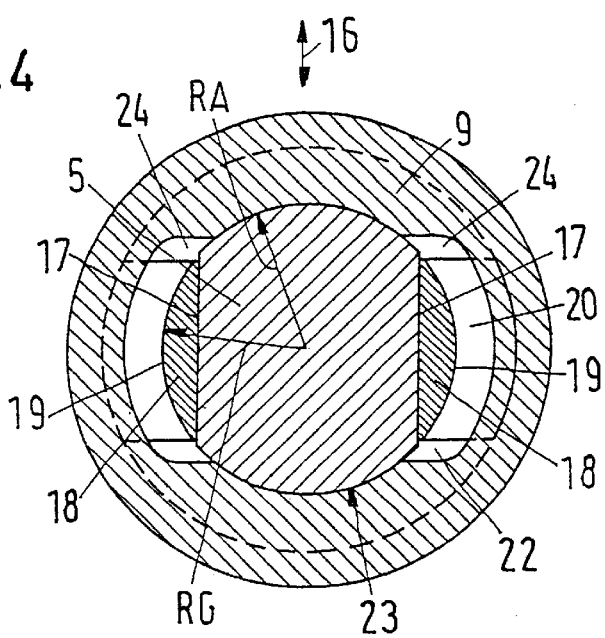
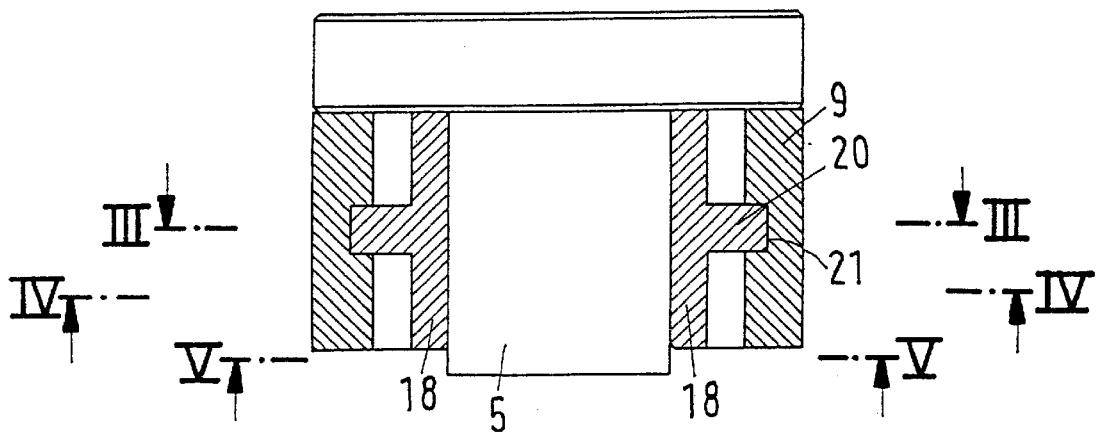
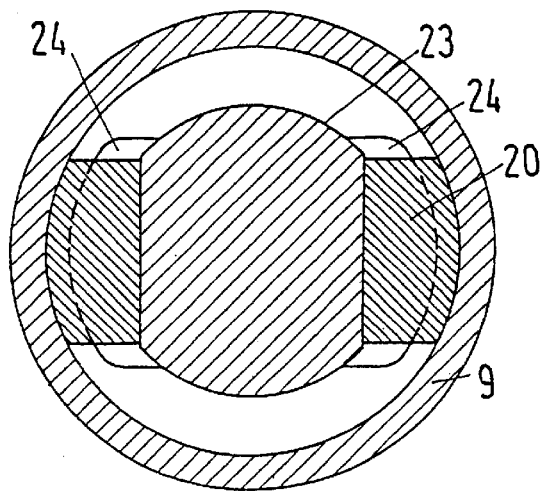

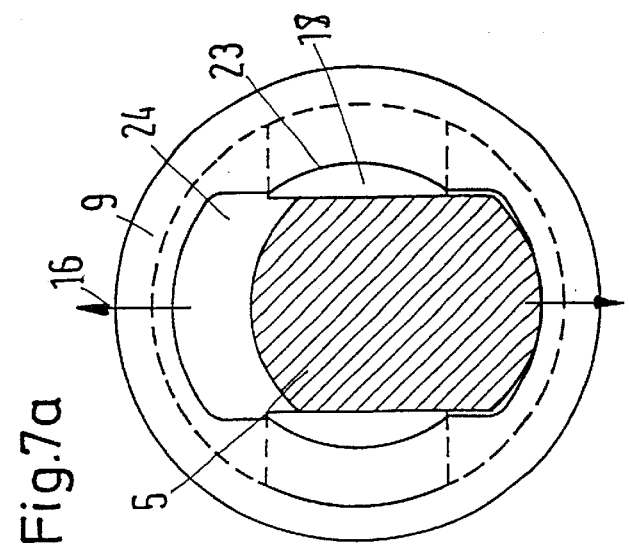
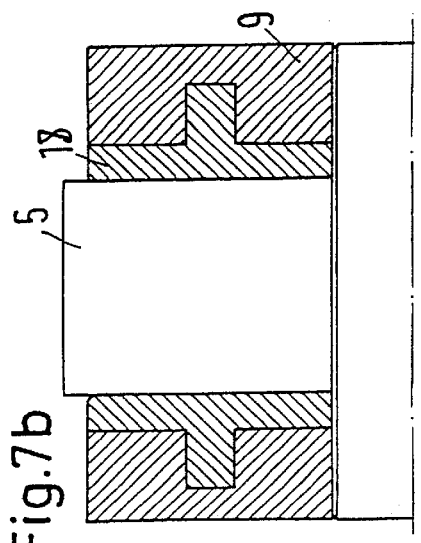
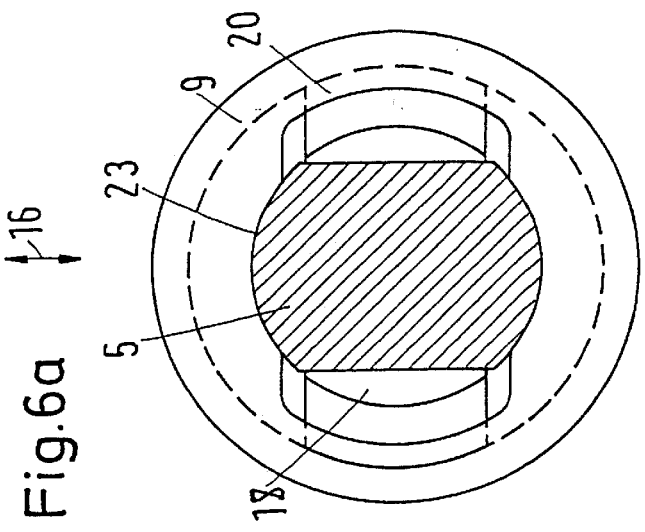
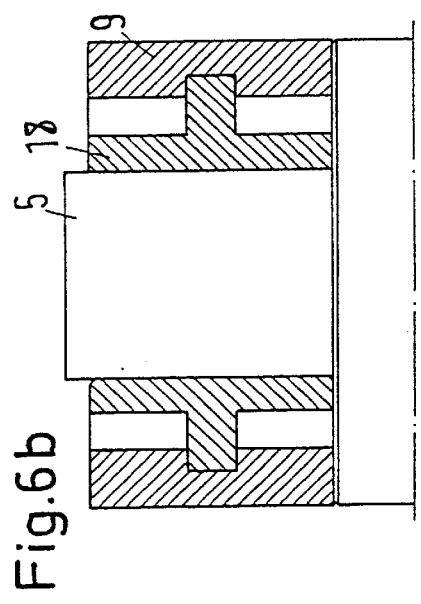
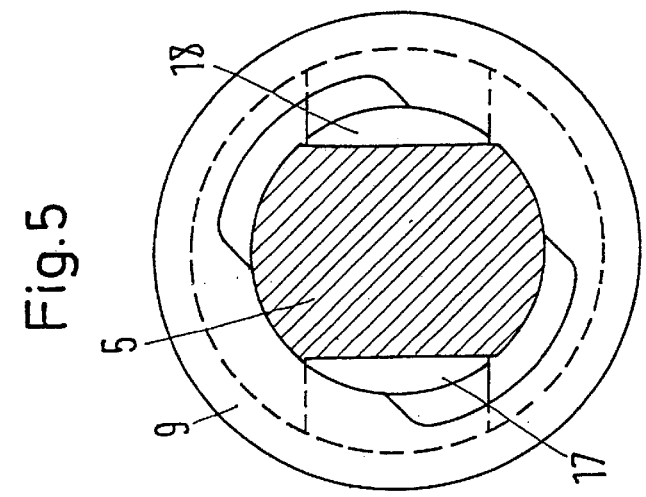

ROLL AND CALENDER

CROSS-REFERENCE TO RELATED APPLICATIONS

The present application claims priority under 35 U.S.C. §119 of German Patent Application No. 199 55 862.0, filed on Nov. 20, 1999, the disclosure of which is expressly incorporated by reference herein in its entirety.

BACKGROUND OF THE INVENTION

1. Field of the Invention

The invention relates to a roll with a roll jacket that is rotatably supported by a bearing ring on an axis that is held in a non-rotatable manner. The bearing ring is moveable relative to an axis parallel to a radial direction, and a locking device that unblocks or blocks a radial lift movement. The invention further relates to a calender roll that includes the neighboring roll arranged to form a nip, and at least one further roll. The neighboring roll and the at least one further roll are displaceable in the pressing direction.

2. Discussion of Background Information

Such a roll is known, e.g., from DE 36 04 839 C2. Here, a locking device is formed as a half-moon or sickle-shaped wedge that can be placed into a gap between the roll jacket and the axis when the roll jacket is located in a completely raised or completely lowered position relative to the axis.

In many calenders, sag compensation rolls are used as the upper and lower end rolls. However, both of these sag compensation rolls are of different types, which are usually labeled as K and F types, i.e., the one roll is embodied as a roll with a jacket lift. Such a roll, the roll jacket can move in a radial direction relative to the axis. In the other roll, however, the roll jacket is firmly fixed on the axis, which results in necessitating that two different reserve rolls must also be kept in stock. For this reason, a possibility is provided in the above-mentioned DE 36 04 839 C2 of being able to achieve both types of roll with one single reserve roll. However, in order to reconfigure this roll from one type of roll, e.g., with a jacket lift, to the other type of roll, i.e., without a jacket lift, some mounting measures are necessary. This is relatively unpractical and dangerous, especially in the case of calenders that remain online. Above all, the reconfiguration expense is relatively high.

SUMMARY OF THE INVENTION

The invention simplifies the change in mode of operation from a roll with jacket lift ability to a roll with a fixed jacket.

Therefore, the present invention a roll of the type mentioned at the outset in which the locking device has a rotatable part with a longitudinal opening that can be turned to a first rotational setting in which the longitudinal opening is aligned substantially parallel to the lift movement direction, and a second rotational setting, in which the lift movement is blocked.

With this construction, it is possible to change the mode of operation from a roll with jacket lift ability to a roll in which the jacket is fixed to the axis, or vice versa, without any other retrofitting measures. It is simply necessary for the rotatable part of the locking device to rotate correspondingly. In one rotational setting, the longitudinal opening provides a path of movement in which the axis can be moved relative to the roll jacket. In the other rotational setting, the longitudinal opening is structured in such a way that this path of movement is no longer available. If the axis is fixed laterally, i.e., crosswise to the lift direction relative to the axis, the roll jacket is fixed on this axis with a relatively high degree of precision in this setting of the rotatable part. Usually, the rotatable part is rotated approximately 90° between the first and second rotational settings. However, this is not obligatory. It is also conceivable to use more than one rotatable part, as long as the condition is fulfilled that one longitudinal opening, in one rotational setting, allows the lift movement of the axis in the roll jacket or of the roll jacket relative to the axis, while this lift movement is prevented in the other rotational settings.

Preferably, the rotatable part is formed by the bearing ring or is moveable together with it. This facilitates the production as well as the handling. The bearing ring is rotatable relative to the roll jacket in any case. In this regard, therefore, no further arrangements need to be made. The only additional task is making the bearing rotatable relative to the axis as well in order to bring the longitudinal opening either into alignment with the lift movement direction or to remove it therefrom.

Preferably, the rotatable part can be rotated around the rotational axis of the roll jacket. This further simplifies the movement control and the constructive structure.

Preferably, the longitudinal opening has concave sections on its longitudinal edges whose bending radius corresponds to the axis in this region, where the axis in the region of the rotatable part has flattened sections that extend parallel to the direction of movement. The concave sections can be used to support the rotatable part on the axis if the rotatable part is in the blocked position. In this case, the rotatable part encloses the axis and lies against the circumference with its concave sections. Even if this contact does not occur over the entire circumference of the axis, the bearing is sufficient in most cases.

Preferably, the distance between the flattened sections is just as large as the clear width of the longitudinal opening. Thus, the longitudinal opening simultaneously also serves as a guide for the rotatable part in relation to the axis during the lift movement.

More advantageously, slides lie on the flattened sections. These slides have a flat underside and an upper side having the same bend as the axes in the region of the rotatable part, at least on one part of the axial length. Therefore, on this part of the axial length, the assembly of the axis and slides forms a cylinder jacket surface such that the rotatable part can be supported in every rotational position on a corresponding section of the cylinder jacket surface. Thus, the rotatable part is held reliably when the roll jacket performs a lift movement in relation to the axis.

Here, it is preferred for the slides to have a radially protruding projection with at least one support surface that cooperates in the axial direction with a corresponding opposing surface on the rotatable part. Thus, an axial fixing of the rotatable part in relation to the axis and/or the slides is achieved.

Preferably, the projection fits into an inner groove on the rotatable part. Thus, the slide is fixed in both axial directions in relation to the rotatable part.

Preferably, the rotatable part is supported on the radially outer side of the projections. Thus, a further support option results for the rotatable part that is particularly advantageous when the roll jacket is fixed in relation to the axis. Namely, in this case, the rotatable part can be supported in relation to the axis on at least a total of four positions. Even if one or the other support is occasionally less effective or not effective at all, e.g., due to strain, a very stable support is achieved with this construction.

Preferably, the roll is embodied as a sag compensation roll. Such rolls are best able to utilize the jacket lift characteristic.

It is also advantageous that the axis has a decreased diameter in the region of the rotatable part. Thus, sufficient space is available to accommodate the rotatable part without the diameter of the roll jacket needing to be overly enlarged.

The present invention provides a calender of the type mentioned at the outset which includes devices that optionally block or unblock the neighboring roll.

Such a construction provides the option of operating the calender with all nips. In this case, the jacket is fixed in relation to the axis, such that the ability of the jacket to be displaced is blocked. Further, the neighboring roll is freely displaceable, which is important for opening the nips, among other things. Opening the nips is necessary, e.g., for inserting a material web. However, if the calender is to be operated with only one nip, i.e., formed between the roll whose jacket lift function may be activated or deactivated and the neighboring roll, the neighboring roll is fixed in such a way that it can no longer be displaced. The rest of the rolls in the calender, however, can be displaced such that the nips on which they border are open. In order to now be able to open the nip between the roll and the neighboring roll as well, the jacket lift function of the roll is activated. Therefore, the nip is opened in that the jacket of the roll is displaced in relation to the axis with the jacket lift function. Thus, a relatively large degree of freedom is obtained in selecting the operational options of the calender.

Preferably, the neighboring roll is mounted in a seating by way of a lever, where the device blocks a pivoting movement of the lever relative to the seating. This is a relatively simple measure to block or unblock the ability of the roll to be displaced. In the most simple case, a socket pin that is guided through the lever and seating is sufficient to fix the neighboring roll in the seating.

More preferably, the device includes a load limiting device, which prevents damage from resulting in situations where too-large forces occur. If, e.g., the forces from the roll with a jacket lift become too great and the danger arises of the roll jacket of one of the two rolls being damaged, the load limiting device is triggered and unblocks the neighboring roll. In the simplest case, the load limiting device can be formed by the pin that serves to fix the lever in the seating. Such a pin can be dimensioned in such a way that it shears off when too-large forces occur. Naturally, other devices are also possible, e.g., hydraulic piston-cylinder units or the like.

Preferably, the locking device is embodied as described in connection with the roll. This simplifies the change-over.

The instant invention is directed to a roll that includes a roll axle, a roll jacket, and a bearing ring positioned to rotatably support the roll jacket. The bearing ring is non-rotatable but is radially movable relative to the roll axle. A locking device is positionably adjustable to selectively block and unblock a radial lift movement, and the locking device includes a rotatable part having a longitudinal opening. The rotatable part is rotatable into a first rotational position in which the longitudinal opening is oriented substantially parallel to a direction of the radial lift movement, and is rotatable into a second rotational position in which the radial lift movement is blocked.

In accordance with a feature of the instant invention, the rotatable part can either be formed by the bearing ring or be movable with the bearing ring.

According to another feature of the invention, the rotatable part can be positioned to rotate around a rotational axis of the roll jacket.

The longitudinal opening may include longitudinal edges having concave sections with a bending radius that corresponds to the roll axle in this region. The roll axle may include flattened sections in a region of the rotatable part which extend substantially parallel to the direction of radial lift movement. The distance between the flattened sections can be as large as an opening width of the longitudinal opening. Further, slides may be arranged to lie on the flattened sections, and each of the slides can have a flat lower side arranged adjacent the flattened sections and an upper side having a bending radius over at least a part of its axial length that is the same as the bending radius of the axle in the region of the rotatable part. The slides may have a radially protruding projection having at least one support surface that cooperates in an axial direction with a corresponding opposing surface on the rotatable part. The projection can be structured to fit into an inner groove on the rotatable part. The rotatable part may be supported on a radially outer side of the projections.

In accordance with the present invention, the roll can include a sag compensation roll.

According to another feature of the invention, the axle can have a decreased diameter in the region of the rotatable part.

The present invention is directed to a calender that includes a roll having a roll jacket rotatably supported on an axle by a non-rotatable bearing ring. The bearing ring is radially movable relative to the axle and includes a locking device arranged to selectively block and unblock a radial lift movement. A neighboring roll is arranged to form a nip with the roll, and at least one further roll is provided, such that the neighboring roll and the further rolls are mounted for displacement in the pressing direction, and a device arranged to selectively block and unblock the displacement of the neighboring roll.

In accordance with a feature of the present invention, the calender can further include a seating and a lever for mounting the neighboring roll in the seating. The device may selectively block and unblock a pivoting movement of the lever relative to the seating.

In accordance with another feature of the invention, the device can include a load limiting device.

The present invention is directed to a process of operating a roll that includes a roll axle, a roll jacket, and a non-rotatable bearing ring positioned to rotatably support the roll jacket and to be radially movable relative to the roll axle. A locking device is positionably adjustable to selectively block and unblock a radial lift movement, and includes a rotatable part having a longitudinal opening. The process may include one of (a) rotating the rotatable part into a first rotational position in which the longitudinal opening is oriented substantially parallel to a direction of the radial lift movement, and (b) rotating the rotatable part into a second rotational position in which the radial lift movement is blocked.

According to a feature of the invention, when in the first rotational position, the roll can be operable as a lift jacket roll.

In accordance with yet another feature of the invention, when in the second rotational position, the roll can be operable as a stationary roll.

The present invention is directed to a process of operating a calender that includes a roll having a roll axle, a roll jacket, and a non-rotatable bearing ring positioned to rotatably support the roll jacket and to be radially movable relative to the roll axle. A locking device is positionably adjustable to selectively block and unblock a radial lift movement, and includes a rotatable part having a longitudinal opening.

Further, a neighboring roll is arranged to form a nip with the roll, and at least one further roll is provided, such that the neighboring roll and the at least one further roll is positionably displaceable in a pressing direction. The process includes one of blocking and unblocking the neighboring roll from being positionably displaceable, and one of (a) rotating the rotatable part into a first rotational position in which the longitudinal opening is oriented substantially parallel to a direction of the radial lift movement, and (b) rotating the rotatable part into a second rotational position in which the radial lift movement is blocked.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2 illustrates a segment of an enlarged longitudinal section for depicting a bearing ring;

FIG. 3 illustrates a section III—III according to FIG. 2;

FIG. 4 illustrates a section IV—IV according to FIG. 2;

FIG. 5 illustrates a section V—V according to FIG. 2 with an intermediate setting;

FIGS. 6a and 6b illustrate views of an operational setting of the arrangement depicted in FIG. 5;

FIGS. 7a and 7b illustrate views of another operational setting of the arrangement depicted in FIG. 5;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
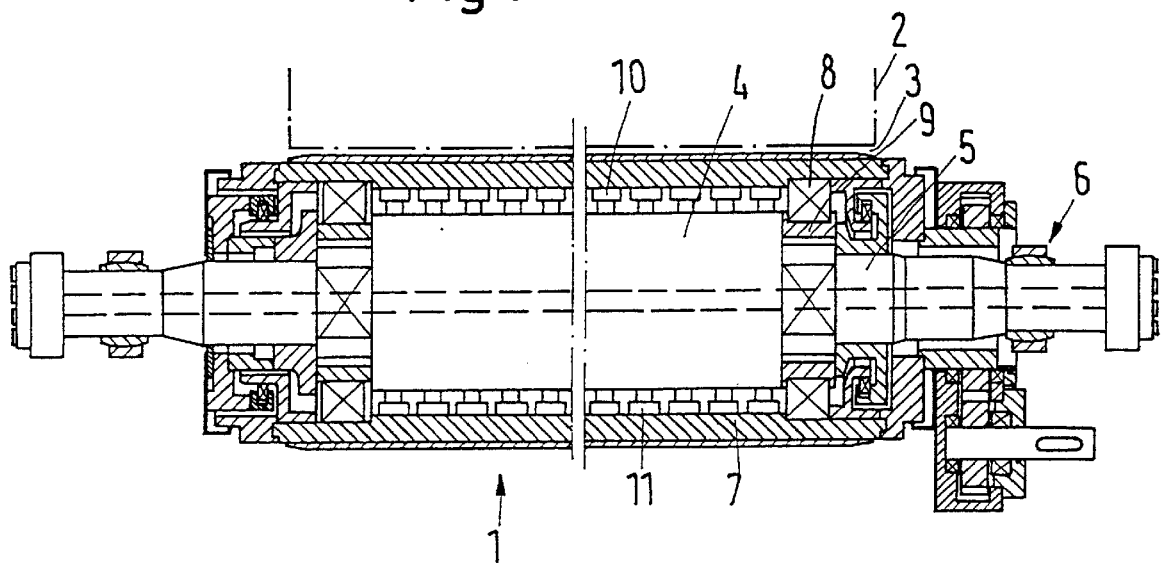
FIG. 1 illustrates a longitudinal section of a roll.

FIG. 1 shows a sag-controlled roll 1 that can cooperate with an opposing roll 2 shown with dot-dash lines for the purpose of subjecting a material web, e.g., a paper web, to pressure and, optionally, increased temperature, in a nip 3 between the two rolls.

Roll 1 has an axis 4 that has axis pins 5 with a decreased, optionally graduated, diameter. Roll 1 is mounted in a seating (not shown) with axis pins 5 by way of domed bearings 6.

Furthermore, the roll has a roll jacket 7 that is mounted in the region of each of its axial ends on a bearing ring 9 by way of a bearing 8.

In relation to axis 4, roll jacket 7 is supported upwardly with a first row of support elements, e.g., hydrostatic support elements 10, and downwardly with a second roll of support elements 11. In a manner that is known per se, an adjustment of the sag of roll jacket 7 can be achieved by an appropriate drive of the individual support elements 10 and 11. Furthermore, support elements 10 and 11 can be used with some roll types for the purpose of raising or lowering roll jacket 7 as a whole in relation to axis 4.

In order to achieve this, bearing ring 9 can be displaced in relation to axis 4 parallel to a radial direction of axis 4. In the illustration of FIG. 1, this is in the pressing direction, i.e., a direction parallel to the plane of the drawing upwardly or downwardly.

However, it is desirable to also be able to operate roll 1 in a state in which roll jacket 7 is fixed in relation to axis 4. Preferably, roll jacket 7 should lie concentrically to axis 4 in this state.

Figure 8A:
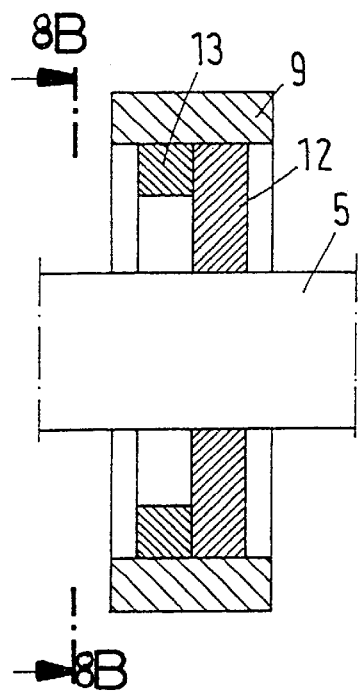
FIGS. 8a and 8b illustrate views of a principle according to the present invention.
Figure 8B:
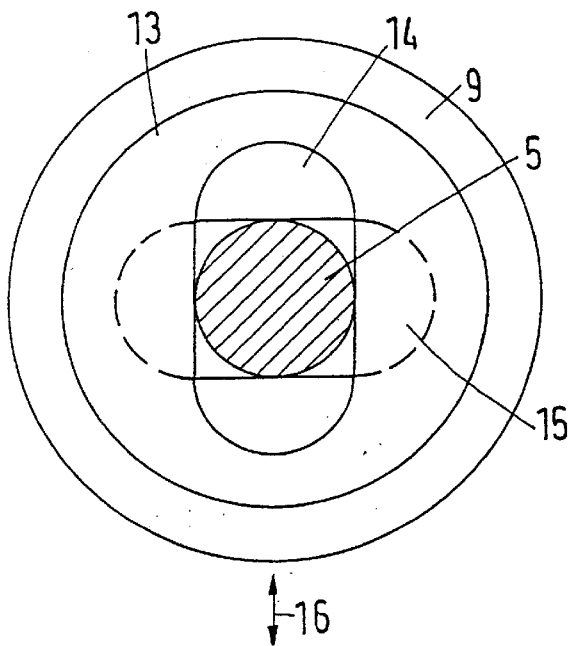

In order to achieve this, a locking device is provided that is depicted in principle in FIGS. 8a and 8b. There, only bearing ring 9 and axis pin 5 as well as the parts necessary for locking are shown.

FIG. 8b shows a view along section line 8B—8B depicted in FIG. 8a.

The locking device has a first disc 12 and a second disc 13. Disc 13 is arranged in a fixed manner in bearing ring 9 and has a longitudinal hole as a guidance opening whose clear width corresponds to the diameter of axis pin 5 and whose height or length corresponds to the desired roll lift. Disc 12 has a corresponding longitudinal hole 15. Disc 12 can be rotated in relation to disc 13.

In the rotational position shown in FIG. 8b, axis pin 5 is held by the cooperation of the two longitudinal holes 14 and 15. Therefore, bearing ring 9 cannot move in pressing direction 16. If, however, disc 12 is rotated about 90° in relation to disc 13, both longitudinal holes 14 and 15 overlap with one another so that roll pin 5 can move in pressing direction 16 relative to bearing ring 9. In this manner, the necessary lifting forces can be applied by way of support elements 10, 11.

FIGS. 2 to 4 show one possibility for achieving this principle.

In the region of the bearing ring, axis pin 5 has two flattened sections 17 that extend parallel to pressing direction 16. On these sections 17 are arranged slides 18, which rest on flattened sections 17 with their flat lower side. Moreover, they have a convex surface 19 whose bending radius RG is virtually identical to the bending radius RA of axis pin 5. In the position of slides 18 depicted in FIG. 4, surface 19 of slides 18 forms a cylindrical jacket surface along with the regions of axis pin 5 that are not flattened.

The slides 18 each have a projection 20 approximately in their axial center whose circumferential surface also follows a cylindrical jacket surface.

This projection fits into a circumferential groove 21 that is formed in bearing ring 9. Here, bearing ring 9 is embodied in the form of a disc and thus takes over the function of disc 12 according to FIG. 8. Here, projection 20 lies across from slides 18 in groove 21 in every rotational setting of bearing ring 9 in such a way that bearing ring 9 is fixed in relation to slides 18 in both axial directions and is also supported on the slides in the radial direction.

Bearing ring 9 has a longitudinal opening 22 that is formed in that a central bore 23 is extended with free positions 24. Both free positions 24 lie diametrically across from one another. Their width essentially corresponds to the distance between sections 17 of axis pin 5 However, due to the remaining sections of bore 23, bearing ring 9 is not only freely rotatable on axis pin 5, but it is also always supported with these sections of bore 23 on the cylindrical jacket surface formed by the circumferential surface of axis pin 5 or slides 18.

As can be seen from FIG. 5, bearing ring 9 can now be rotated relative to axis pin 5. In the rotational angle setting shown in FIG. 5, bearing ring 9 is partially supported on axis pin 5 and partially supported on the circumference of slides 18.

FIGS. 6*a* and 6*b* show a position that corresponds to that of FIGS. 2 to 4. Bearing ring 9 lies on axis pin 5 with bore 23. Thus, bearing ring 9 is fixed in relation to axis pin 5. Slides 18 are also fixed because projection 20 is held in groove 21. If, however, as is shown in FIGS. 7*a* and 7*b*, bearing ring 9 is rotated about 90° in relation to axis pin 5, bearing ring 9 is supported with bore 23 on surface of slides 18. Free positions 24 overlap with the region of axis pin 5 not covered by slides 18. Correspondingly, a movement space is available for axis pin 5 in sliding ring 9 or for sliding ring 9 on axis pin 5, such that bearing ring 9 can be displaced in the direction of double arrow 16 in relation to axis pin 5.

In the rotational position of bearing ring 9 relative to axis pin 5 shown in FIGS. 7*a* and 7*b*, roll 1 is a jacket lift roll. In the rotational position shown in FIG. 6, a roll 1 has no jacket lift function. Retrofitting measures for the purpose of switching from one function to the other are not necessary. It is merely necessary to rotate bearing ring 9 in relation to axis pin 5. Bearing ring 9 is rotatable in relation to roll jacket 7 in any case.

Figure 9C:
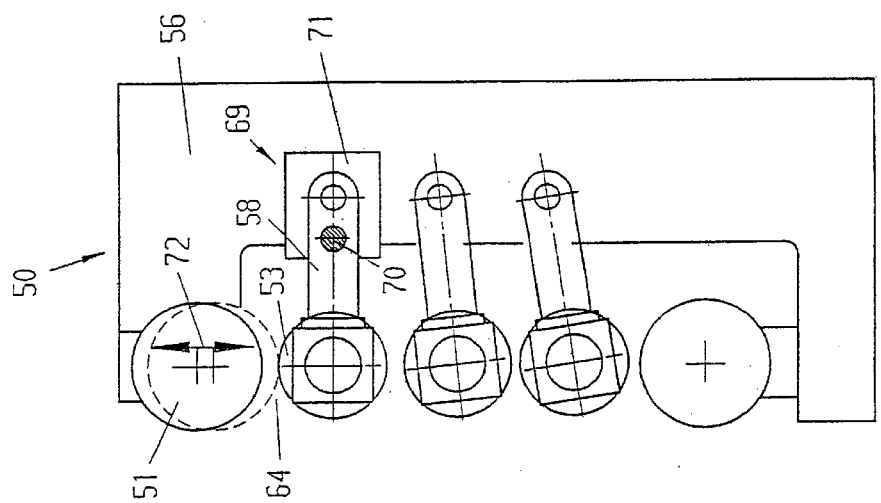
FIGS. 9a–9c illustrates various operating modes of a calender in accordance with the instant invention.
Figure 9B:
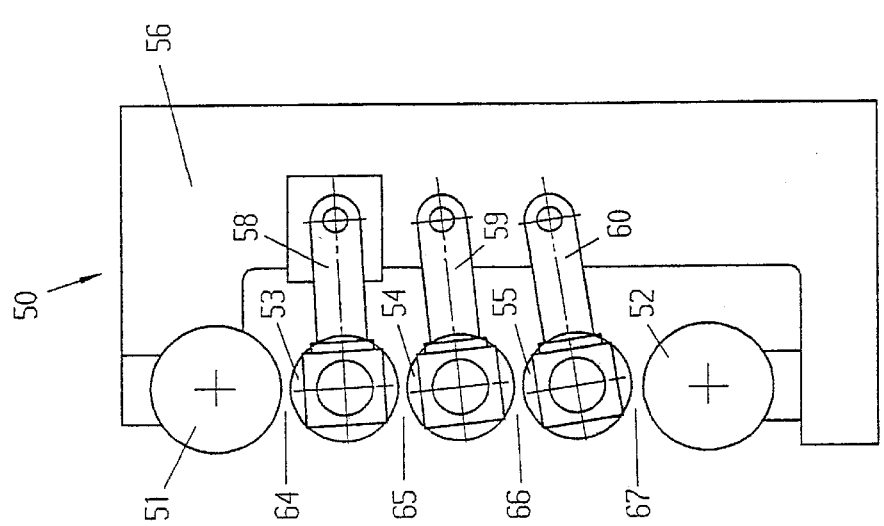
Figure 9A:
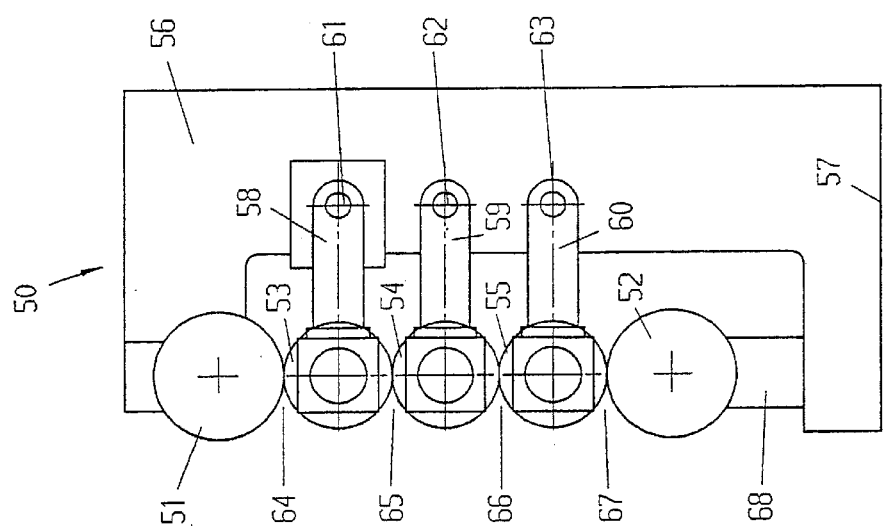

FIGS. 9*a*–9*c* show a calender 50 with an upper roll 51, a lower roll 52, a neighboring roll 53 which neighbors upper roll 51, and further rolls 54 and 55. All rolls are arranged in a seating 56. Lower roll 52 can optionally also stand on floor 57 if the latter is not a component of seating 56.

Upper roll 51 and lower roll 52 are formed as sag compensation rolls. They both have a jacket lift ability, where the jacket lift can be blocked at least in upper roll 51, in the manner depicted in FIGS. 1 to 8. Rolls 53, 54, and 55 arranged between upper roll 51 and lower roll 52 are mounted in seating 56 by way of levers 58, 59, and 60, which are pivotable around pivot points 61, 62, and 63, respectively.

FIG. 9*a* shows an operational state in which all nips 64, 65, 66, 67 formed between rolls 51–55 are closed. A material web, which is not shown in greater detail, e.g., a paper web, can be fed through nips 64–67 to be subject to pressure and, optionally, increased temperature. Here, the roll jacket of upper roll 51 is fixed. The pressure is applied on lower roll 52, which is raised for this purpose. As stated, the lifting can occur by way of the jacket lift. However, it is also possible for the lower roll 52 to be mounted in a fixture 68 whose height can be altered, e.g., a piston-cylinder unit.

FIG. 9*b* shows a state of the calender 50 in which all nips 64–67 are open. For this purpose, lower roll 52 is lowered and upper roll 51 remains stationary. The opening of nips 64–67 is necessary in order to thread a material web. Due to the pivoting possibilities of levers 58–60, rolls 53–55 simply fall or pivot downwardly due to gravity until levers 58–60 come to a rest position on stops, which are not shown in greater detail.

In some cases, it is desirable to treat the material web in only one nip. As shown in FIG. 9*c*, nip 64 is provided for this purpose.

In order to achieve such a treatment, lever 58, on which neighboring roll 53 is hung, may be locked in seating 56. Device 69 is provided for this purpose with which the pivoting motion of lever 58 relative to seating 56 may be hindered or blocked. In the simplest case, device 69 includes a pin 70 that can be guided through lever 58 and an opposing mounting 71 fixed on seating 56. In this case, neighboring roll 53 is fixed in seating 56. Therefore, it cannot change its position relative to surface 51. However, in order to still be able to open nip 64, the jacket lift function is activated in upper roll 51 so that upper roll 51, or, more precisely, its jacket, can be lifted (drawn in solid lines) in the direction of double arrow 72 in order to open nip 64 or can be lowered (drawn in dashed lines) in order to close nip 64.

Independently of which construction lower roll 52 has (with a jacket lift or without a jacket lift), in order to achieve this mode of operation, it must be provided that upper roll 51 of calender 50 has a blockable jacket lift and the mobility of neighboring roll 53 can be blocked.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A roll comprising:
   a roll axle;
   a roll jacket;
   a bearing ring positioned to rotatably support said roll jacket, said bearing ring not rotating with said roll jacket but being radially movable relative to said roll axle;
   a locking device positionably adjustable to selectively block and unblock a radial lift movement, said locking device comprising a rotatable part having a longitudinal opening; and
   said rotatable part being rotatable into a first rotational position in which said longitudinal opening is oriented substantially parallel to a direction of said radial lift movement, and being rotatable into a second rotational position in which said radial lift movement is blocked.

2. The roll in accordance to claim 1, wherein said rotatable part either is formed by said bearing ring or is movable with said bearing ring.

3. The roll in accordance to claim 1, wherein said rotatable part is positioned to rotate around a rotational axis of said roll jacket.

4. The roll in accordance to claim 1, wherein said longitudinal opening comprises longitudinal edges having concave sections with a bending radius that correspond to said roll axle in this region, and
   said roll axle comprising flattened sections in a region of said rotatable part which extend substantially parallel to the direction of radial lift movement.

5. The roll in accordance to claim 4, wherein the distance between said flattened sections is as large as an opening width of said longitudinal opening.

6. The roll in accordance to claim 4, wherein slides are arranged to lie on said flattened sections, and each of said slides have a flat lower side arranged adjacent said flattened sections and an upper side having a bending radius over at least a part of its axial length that is the same as the bending radius of the axle in the region of said rotatable part.

7. The roll in accordance to claim 6, wherein said slides have a radially protruding projection having at least one support surface that cooperates in an axial direction with a corresponding opposing surface on said rotatable part.

8. The roll in accordance to claim 7, wherein said projection is structured to fit into an inner groove on said rotatable part.

9. The roll in accordance to claim 7, wherein said rotatable part is supported on a radially outer side of said projections.

10. The roll in accordance to claim 1, wherein said roll comprises a sag compensation roll.

11. The roll in accordance to claim 1, wherein said axle has a decreased diameter in the region of said rotatable part.

12. A process of operating a roll that includes a roll axle, a roll jacket, bearing ring positioned to rotatably support the roll jacket, to not rotate with the roll jacket and to be radially movable relative to the roll axle, and a locking device, which is positionably adjustable to selectively block and unblock a radial lift movement, wherein the locking device includes a rotatable part having a longitudinal opening, said process comprising:

one of:

(a) rotating the rotatable part into a first rotational position in which the longitudinal opening is oriented substantially parallel to a direction of the radial lift movement, and (b) rotating the rotatable part into a second rotational position in which the radial lift movement is blocked.

13. The process in accordance with claim 12, wherein in the first rotational position, the roll is operable as a lift jacket roll.

14. The process in accordance with claim 12, wherein in the second rotational position, the roll is operable as a stationary roll.

15. A process of operating a roll that includes a roll axle, a roll jacket, bearing ring positioned to rotatably support the roll jacket, to not rotate with the roll jacket and to be radially movable relative to the roll axle, and a locking device, which is positionably adjustable to selectively block and unblock a radial lift movement, wherein the locking device includes a rotatable part having a longitudinal opening, said process comprising:

at least one of:

(a) rotating the rotatable part into a first rotational position in which the longitudinal opening is oriented substantially parallel to a direction of the radial lift movement, and (b) rotating the rotatable part into a second rotational position in which the radial lift movement is blocked.

\* \* \* \* \*